(12) United States Patent
Pike et al.

(10) Patent No.: US 12,731,099 B2
(45) Date of Patent: Sep. 8, 2026

(54) FREIGHT NETWORK SYSTEM USING MODULARIZED TRAILERS

(71) Applicant: Uber Technologies, Inc., San Francisco, CA (US)

(72) Inventors: Maxwell MacGavin Pike, San Francisco, CA (US); William Driegert, Tiburon, CA (US); Robert Gestie Chappuis, Chicago, IL (US); Eric Berdinis, San Francisco, CA (US); Anne Canfield Kadavy, San Francisco, CA (US); Lior Ron, Palo Alto, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 18/674,474

(22) Filed: May 24, 2024

(65) Prior Publication Data

US 2024/0311747 A1 Sep. 19, 2024

Related U.S. Application Data

(63) Continuation of application No. 17/670,791, filed on Feb. 14, 2022, now Pat. No. 11,995,602, which is a (Continued)

(51) Int. Cl.

*G06Q 10/0833* (2023.01)
*G01S 19/13* (2010.01)
*G06Q 10/0834* (2023.01)

(52) U.S. Cl.

CPC ..... *G06Q 10/0833* (2013.01); *G06Q 10/0834* (2013.01); *G01S 19/13* (2013.01)

(58) Field of Classification Search

CPC . G06Q 10/0833; G06Q 10/0834; G01S 19/13

(Continued)

(56) References Cited

U.S. PATENT DOCUMENTS 3,953,720 A 4/1976 Kelch
5,880,958 A 3/1999 Helms et al.

(Continued)

FOREIGN PATENT DOCUMENTS

CN 101951545 1/2011
CN 103577949 2/2014

(Continued)

OTHER PUBLICATIONS

"Truck Activity Monitoring System for Freight Transportation Analysis" Published by Sage Journals (Year: 2017).*

(Continued)

*Primary Examiner* — Zeina Elchanti
(74) *Attorney, Agent, or Firm* — Dority & Manning, P.A.

(57) ABSTRACT

A computer system receives a freight request from a shipper, where the freight request specifies a destination for a load of the shipper. The computer system implements a selection process to select a freight operator to haul a corresponding trailer of the trailer module from a location of the shipper to a destination. The trailer module may be monitored using information transmitted from the trailer, to determine when the trailer is picked up and/or delivered at the destination.

20 Claims, 4 Drawing Sheets

Related U.S. Application Data continuation of application No. 15/721,686, filed on Sep. 29, 2017, now Pat. No. 11,250,372.

(60) Provisional application No. 62/562,346, filed on Sep. 22, 2017.

(58) Field of Classification Search
USPC .......................................................... 705/333
See application file for complete search history.

(56) References Cited

U.S. PATENT DOCUMENTS 6,205,793 B1 3/2001 Schimp
6,411,897 B1 6/2002 Gaspard, II
6,456,207 B1 9/2002 Yen
6,516,056 B1 2/2003 Justice et al.
6,591,253 B1 7/2003 Dinkin et al.
6,879,962 B1 4/2005 Smith et al.
7,315,780 B2 1/2008 Sugahara et al.
7,353,181 B2 4/2008 Nel
7,385,529 B2 6/2008 Hersh et al.
7,552,063 B1 6/2009 McEachern
7,561,069 B2 7/2009 Horstemeyer
8,131,307 B2 3/2012 Lubeck et al.
8,271,316 B2 9/2012 Blackshaw et al.
8,452,713 B2 * 5/2013 Stemple ............... G06Q 10/083 340/988
9,135,803 B1 9/2015 Fields et al.
9,256,852 B1 2/2016 Myllymaki
9,478,150 B1 10/2016 Fields et al.
9,552,564 B1 1/2017 Martenis
9,908,530 B1 3/2018 Fields et al.
9,921,070 B1 3/2018 Nimchuk et al.
9,955,326 B2 4/2018 Avrahami et al.
10,500,975 B1 * 12/2019 Healy ...................... B60K 6/48
2002/0034292 A1 3/2002 Tuoriniemi et al.
2002/0065738 A1 5/2002 Riggs et al.
2002/0095308 A1 7/2002 Pragelas et al.
2002/0138338 A1 9/2002 Trauth et al.
2002/0188517 A1 12/2002 Banerjee et al.
2002/0194129 A1 12/2002 Furuya et al.
2003/0036935 A1 2/2003 Nel
2003/0087648 A1 5/2003 Mezhvinsky et al.
2003/0233190 A1 12/2003 Jones
2004/0106399 A1 6/2004 Ki
2004/0112959 A1 6/2004 Jun
2004/0158483 A1 8/2004 Lecouturier
2004/0219933 A1 11/2004 Faith
2004/0249699 A1 12/2004 Laurent et al.
2004/0249818 A1 12/2004 Isaac
2004/0260470 A1 12/2004 Rast
2005/0096837 A1 5/2005 Yoshizumi
2005/0149382 A1 7/2005 Fenner et al.
2005/0227704 A1 10/2005 Ferra et al.
2005/0278063 A1 12/2005 Hersh et al.
2006/0015233 A1 * 1/2006 Olsen, III ................ G07C 9/28 701/2
2006/0059023 A1 3/2006 Mashinsky
2006/0136254 A1 6/2006 Greenstein
2006/0155460 A1 7/2006 Raney
2006/0195348 A1 8/2006 Peterkofsky et al.
2006/0200306 A1 9/2006 Adamcyzk
2006/0200396 A1 9/2006 Satterfield et al.
2006/0206387 A1 9/2006 Peterkofsky et al.
2006/0217885 A1 9/2006 Crady et al.
2007/0103342 A1 5/2007 MilleVille
2007/0221791 A1 9/2007 Voelk et al.
2008/0086322 A1 4/2008 Wallace
2008/0114629 A1 5/2008 Pavlov
2008/0125967 A1 5/2008 Sprigg
2008/0140597 A1 6/2008 Satir et al.
2008/0158016 A1 7/2008 Wang et al.
2008/0162241 A1 * 7/2008 Betancourt ............ G06Q 10/08 705/337
2008/0189207 A1 8/2008 Wurster
2008/0195428 A1 8/2008 O'Sullivan
2008/0270019 A1 10/2008 Anderson et al.
2008/0270204 A1 10/2008 Poykko et al.
2008/0312991 A1 12/2008 Bharadwaj et al.
2009/0030770 A1 1/2009 Hersh et al.
2009/0037095 A1 2/2009 Jani et al.
2009/0049119 A1 2/2009 Marcinkiewicz et al.
2009/0083111 A1 3/2009 Carr
2009/0099971 A1 4/2009 Salemme et al.
2009/0125228 A1 5/2009 Dicke et al.
2009/0177502 A1 7/2009 Doinoff et al.
2009/0216600 A1 8/2009 Hill
2009/0222284 A1 9/2009 McEachern
2009/0254270 A1 10/2009 Yu
2009/0313077 A1 12/2009 Wheeler, IV
2010/0017275 A1 1/2010 Carlson et al.
2010/0076988 A1 3/2010 Kenedy et al.
2010/0223090 A1 9/2010 Lozito
2010/0243724 A1 9/2010 Golla
2011/0010300 A1 1/2011 Audet
2011/0060600 A1 3/2011 Fox et al.
2011/0099040 A1 4/2011 Felt et al.
2011/0137696 A1 6/2011 Meyer et al.
2011/0153495 A1 6/2011 Dixon et al.
2012/0036082 A1 2/2012 Cha et al.
2012/0130627 A1 5/2012 Islam et al.
2012/0179764 A1 7/2012 Erdal
2012/0253548 A1 10/2012 Davidson
2013/0030873 A1 1/2013 Davidson
2013/0041720 A1 2/2013 Spires
2013/0245991 A1 9/2013 Kriss
2013/0306192 A1 * 11/2013 Hennig ............. B60C 23/00336 141/4
2013/0335193 A1 12/2013 Hanson et al.
2014/0122147 A1 5/2014 Christie et al.
2014/0200804 A1 7/2014 Wippler
2014/0229399 A1 8/2014 Ranganathan et al.
2014/0249742 A1 9/2014 Krivacic et al.
2014/0324633 A1 10/2014 Pollak et al.
2014/0330596 A1 11/2014 Depura et al.
2015/0006428 A1 1/2015 Miller et al.
2015/0046229 A1 2/2015 Göllü
2015/0081162 A1 3/2015 Mitchell et al.
2015/0088581 A1 3/2015 Ikawa
2015/0161696 A1 6/2015 Jones et al.
2015/0379468 A1 12/2015 Harvey
2016/0012391 A1 1/2016 Burnett
2016/0042303 A1 2/2016 Medina et al.
2016/0047646 A1 * 2/2016 Ochsendorf ......... G01C 21/343 348/148
2016/0071056 A1 3/2016 Ellison et al.
2016/0104111 A1 4/2016 Jones et al.
2016/0202069 A1 7/2016 Wippler, III
2016/0273922 A1 9/2016 Stefan
2016/0300186 A1 10/2016 Scharaswak et al.
2016/0334236 A1 11/2016 Mason et al.
2017/0046658 A1 2/2017 Jones et al.
2017/0109696 A1 4/2017 Serjeantson et al.
2017/0124506 A1 5/2017 Khan
2017/0132547 A1 5/2017 Myers
2017/0144671 A1 5/2017 Memani et al.
2017/0249847 A1 8/2017 Marueli
2018/0025417 A1 1/2018 Brathwaite et al.
2018/0060774 A1 3/2018 Seaman et al.
2018/0068269 A1 3/2018 Pillai et al.
2018/0096300 A1 4/2018 Boye et al.
2018/0211217 A1 7/2018 Berdinis et al.
2018/0211218 A1 7/2018 Berdinis et al.
2018/0211541 A1 7/2018 Rakah et al.
2019/0118825 A1 4/2019 Madrigal et al.
2019/0122551 A1 4/2019 Madrigal et al.
2019/0130351 A1 5/2019 Arena
2019/0213529 A1 7/2019 Donnelly et al.
2019/0232967 A1 8/2019 Madrigal et al.
2019/0318298 A1 10/2019 Driegert et al.
2019/0385119 A1 12/2019 Chang et al.
2020/0027348 A1 1/2020 Madrigal et al.
2020/0080853 A1 3/2020 Tam et al.

(56) References Cited

U.S. PATENT DOCUMENTS

| | | | |
|---|---|---|---|
| 2020/0242932 | A1 | 7/2020 | Madrigal et al. |
| 2020/0282988 | A1 | 9/2020 | Madrigal et al. |
| 2021/0042705 | A1 | 2/2021 | Suen et al. |

FOREIGN PATENT DOCUMENTS

| | | |
|---|---|---|
| CN | 103692969 | 4/2014 |
| CN | 103761635 | 4/2014 |
| CN | 103870893 | 6/2014 |
| CN | 105069594 | 11/2015 |
| EP | 2827289 | 1/2015 |
| JP | 2002-123887 | 4/2002 |
| JP | 2006-323784 | 11/2006 |
| JP | 2017-165509 | 9/2017 |
| KR | 1020170026805 | 3/2017 |
| NL | 2017377 | 3/2018 |
| WO | WO 1995/027964 | 10/1995 |
| WO | WO 2016/0133594 | 8/2016 |
| WO | WO 2017/025955 | 2/2017 |
| WO | WO 2017/0107854 | 6/2017 |
| WO | WO 2018/0106730 | 6/2018 |
| WO | WO 2018/0107046 | 6/2018 |
| WO | WO 2018/0136179 | 7/2018 |

OTHER PUBLICATIONS

Tang et al., "Design and research of integrated information platform for smart ship." In 2017 4th International Conference on Transportation Information and Safety (ICTIS), 2017, pp. 37-41.

Round et al., "Future Ride: Adopting New Technologies to Paratransit in the United States", Working Paper, UCTC No. 306, University of California Transportation Center, 1996, 51 pages.

Extended European Search Report for Application No. 10835261.8, mailed Oct. 10, 2016, 7 pages.

Examination Report for Application No. AU 2010325793, Jun. 21, 2013, 5 pages.

Examination Report for Application No. AU 2015202596, May 22, 2017, 5 pages.

Examination Report for Application No. AU 2015202596, May 22, 2015, 5 pages.

Hunt, Find a Load, Make an Offer with Carrier 360: Watch the Video, https:/ /www.jbhunt.com/blog/2017 /10/25/ carrier-360-video, Oct. 25, 2017.

Hunt, Booking & Dispatching Loads https:// www.jbhunt.com/blog/2018/05/22/carrier-360- dispatching-freight/, May 22, 2018.

Hunt, Carrier 360 Introduces I'm Not Driving Mode, https://jbhunt.com/blog/2019/06/03/carrier-360-introduces-im-not-driving-mde/, Jun. 3, 2019.

Hunt, Carrier 360 Tutorial: Creating Favorite Lanes [Video] https://jbhunt.com/blog/2018/04/13/carrier-360-favorite-lanes/, Apr. 13, 2018.

Hunt, Carrier 360 Tutorial: Load Board Features [Video], http://www.jbhunt.com/blog/2018/03/01/360-load-board-features, Mar. 1, 2018.

Hunt, Eight Things you can do using your J.B. hunt 360 account, https:/ /www.jbhunt.com/blog/ 2017 /06/13/jbhunt-360, Jun. 13, 2017.

Hunt, Get your next load recommendation from J.B. Hunt 360, https:/ /www.jbhunt.com/blog /2017 /08/02/360-load-recs/, Aug. 2, 2017.

Hunt, Loads Delivered to You: Three Ways to Find Loads Using Carrier 360 by J.B. Hunt, https:/ /www.jbhunt.com/blog/2017 /09/28/find-loads- carrier-360/, Sep. 28, 2017.

Hunt, Simpler is Better: Easy check calls and automated detention, https://www.jbhunt.com/ blog/2018/11/19/ check-cal ls-detention-carrier-360, Nov. 19, 2018.

International Preliminary Report on Patentability for Application No. PCT/US2019/036622, mailed Aug. 4, 2020, 14 pages.

International Search Report and Written Opinion for Application No. PCT/US2018/057538, mailed Jan. 25, 2019, 14 pages.

International Preliminary Report on Patentability for Application No. PCT/US2018/051809, mailed Nov. 11, 2019, 18 pages.

International Search Report and Written Opinion for Application No. PCT/US2019/012516 mailed Apr. 24. 2019, 10 pages.

International Search Report and Written Opinion for Application No. PCT/US2019/036622, mailed Sep. 23, 2019, 15 pages.

International Search Report and Written Opinion for Application No. PCT/US2017/066765, mailed Apr. 13, 2018, 8 pages.

Kuebix, White Paper, Effectively Managing Big Data in Your Supply Chain: How to take action now that will ensure success in the figure, https://www.kuebix.com/white-paper/, 8 pages.

Search Report for Application No. EP 10835261.8, mailed Oct. 1, 2013, 9 pages.

Shigemitsu et al. "AVM System", Fujistu Ten Technical Journal No. 33, 2009, pp. 27-34.

Written Opinion for Application No. PCT/US2019/012516, mailed Oct. 11, 2019, 4 pages.

* cited by examiner

FREIGHT NETWORK SYSTEM USING MODULARIZED TRAILERS

RELATED APPLICATIONS

The present application is a continuation of U.S. Non-Provisional patent application Ser. No. 17/670,791, filed on Feb. 14, 2022, which is a continuation of U.S. Non-Provisional patent application Ser. No. 15/721,686, filed on Sep. 29, 2017 (now issued as U.S. Pat. No. 11,250,372 on Jan. 26, 2022), which claims benefit of priority to Provisional U.S. Patent Application No. 62/562,346, filed on Sep. 22, 2017. Applicant claims priority to and the benefit of each of such applications and incorporates all such applications herein by reference in its entirety.

BACKGROUND

Freight and shipping are integral aspects of modern society. However, freight services are often implemented for large scale operations, making it more difficult to accommodate deviations to planned freight schedules.

Figure 1:
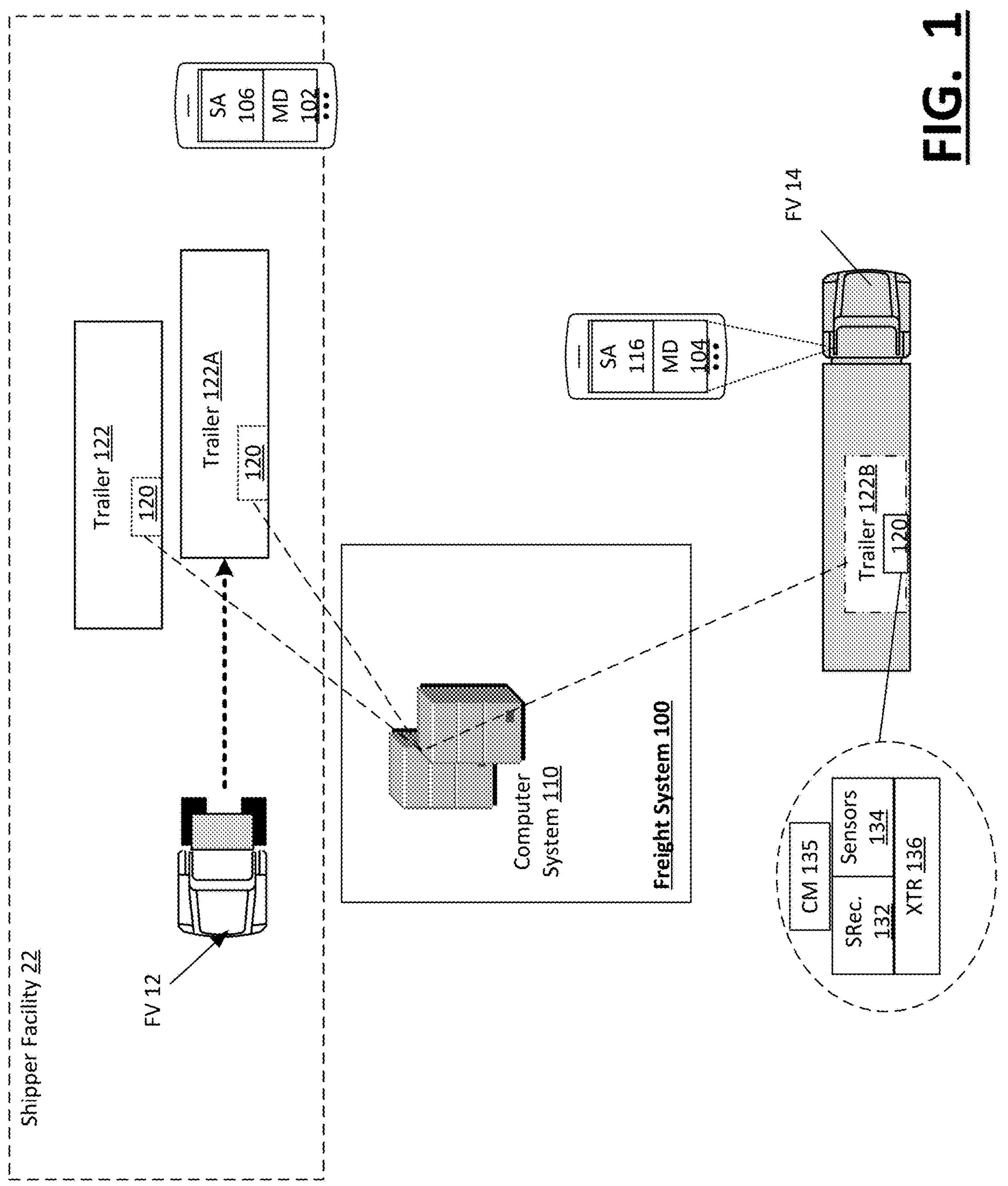
FIG. 1 illustrates a freight system that utilizes modularized trailers.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

Examples provide for a computer system that receives a freight request from a shipper, where the freight request specifies a destination for a load of the shipper. The computer system implements a selection process to select a freight operator to haul a corresponding trailer of the trailer module from a location of the shipper to a destination. The trailer module may be monitored using information transmitted from the trailer, to determine when the trailer is picked up and/or delivered at the destination.

One or more examples described herein provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

Additionally, one or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Moreover, examples described herein can generally require the use of specialized computing devices, including processing and memory resources. For example, one or more examples described may be implemented, in whole or in part, on computing devices such as servers, desktop computers, cellular or smartphones, personal digital assistants (e.g., PDAs), laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor or may be architectures employing multiple processor designs for increased computing capability.

Furthermore, on or more examples described herein may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

FIG. 1 illustrates a freight system that utilizes modularized trailers, according to one or more examples. In more detail, a freight system 100 implements modularized trailers which a shipper can preload. The preloaded trailer can be assigned to a freight operator using selection criteria that includes proximity of available freight operators to the site of the preloaded trailer. By enabling shippers to generate freight requests for modularized preloaded trailers, the freight system 100 allows for freight operators to receive assignments of freight requests, without a requisite of the freight operator having a trailer to carry the load of the shipment request. Rather, the freight system 100 can select the freight operator on behalf of the shipper, from a pool of operators who would, under conventional approaches, have otherwise worked with carriers to receive pre-scheduled deliveries using trailers of the carrier which the freight operator would have to also load. As examples enable individual freight operators to receive assignments without the freight operators being required to provide trailers, the pool of available freight operators can also be expanded. With a greater number of freight operators, the shipper can receive a more cost-efficient experience from freight operators or carriers.

As described by various examples, a freight system 100 can be implemented as a network service, using a computer system 110 and multiple distributed trailer modules 120. Additionally, the freight system 100 can utilize, or otherwise communicate with computing devices operated by users (e.g., shippers and freight operators). In particular, the freight system 100 may provide a shipper interface, from which a shipper can generate a freight request for a pre-loaded trailer 122. For example, a shipper can interact with an 'app' on the shipper's mobile device in order to schedule a freight delivery for an unplanned load. The freight delivery may be planned using a trailer 122 which is provided to the shipper, either before or after the shipper makes the freight request. For example, the shipper may store and/or have ability to use the trailer 122 when needed, but the trailer 122 may be owned by a third entity. While the shipper may retain trailers 122 on-site, such trailers may be managed by the computer system 110, using respective trailer modules 120 that are mounted or otherwise affixed to an interior of the respective trailer. Rather than schedule a freight vehicle carrying a trailer, the freight system 100 enables the shipper to utilize a modularized trailer 122 that can be made available to a larger number of freight operators. Likewise, freight operators can operate independently, without acquiring expensive equipment such as a freight trailer.

By way of example, FIG. 1 illustrates the computer system 110 monitoring a freight operator that operates a freight vehicle 12 to approach an available pre-loaded trailer 122A at a shipper's facility 22. As described in greater detail, the freight operator may be monitored by the computer system 110 for timely arrival. The freight operator may also be monitored to ensure the freight operator locates the correct pre-loaded trailer 122A. The monitoring performed by the computer system 110 may include providing the freight operator with information and content for locating the pre-loaded trailer 122A. For example, the computer system 110 may have an established communication link with a mobile device of the freight operator in order to communicate information to the freight operator about the location and identifier of the pre-loaded trailer 122A.

As another example, FIG. 1 shows the computer system 110 monitoring another freight operator and vehicle 14 to haul a hitched trailer 122B away to a destination specified by the freight request. The computer system 110 can monitor the progress of the freight trailer to ensure, for example, that the trailer 122B arrives in a timely manner at the destination.

According to examples, freight system 100 includes multiple trailers 122, corresponding trailer modules 120, and multiple mobile devices operated by freight operators and/or shippers. Each trailer module 120 may correspond to specialized equipment, mounted or otherwise provided within the trailer 122, to enable the computer system 110 to remotely monitor the trailer 122. In some examples, the trailer modules 120 are housed as a fixture within the trailer 122. Alternatively, the trailer modules 120 may be individually attached to the interior of the trailer, as needed by the shipper or freight operator. For example, the trailer modules 120 may be charged for power and then coupled to a base station within the interior of the trailer 122 once the trailer is loaded and made ready for pick up.

In some examples, each trailer module 120 includes a satellite receiver 132 to obtain position information (e.g., a Global Positioning System or (GPS)), a set of sensors 134 to detect a physical state (e.g., packed, partially packed, fully packed, etc.) of an interior of the trailer 122, and a wireless transceiver 136 to exchange communications with the computer system 110. The trailer module 120 may also include a power source, such as a battery or a connection to an external power source. In operation, the trailer module 120 may utilize or receive control parameters to implement energy conservation optimizations. For example, the trailer module 120 may modulate the frequency by which communications with the computer system 110 are made. The frequency of the communications may be modulated based on, for example, a physical state of the trailer 122 (e.g., loaded, unloaded, partially loaded), a location of the trailer 122, and/or an operating condition or parameter of the freight vehicle that is to haul the trailer 122. For example, the trailer module 120 may utilize sensors 134 (e.g., optical or interior sensing, accelerometer, gyroscope) or its satellite receiver 132 to detect when the freight vehicle begins hauling the trailer 122. Alternatively, the trailer module 120 may use the sensors 134 and/or satellite receiver 132 to determine when the freight vehicle is at a suitable highway speed for arriving at the destination of the corresponding freight request on time. The sensors 134 and/or satellite receiver 132 may also be used by the computer system 110 and/or trailer module 120 to detect if the freight operator is not operating the freight vehicle safely. In an example, the computer system 100 and/or trailer module 120 monitor the location of the trailer module 120, as well as characteristics of movement as detected by one or more sensors 134 (e.g., accelerometer, gyroscope) of the trailer module 120, to detect markers of unsafe driving. For example, the computer system 110 and/or trailer module 120 may use the location and sensor data of the trailer module 120 to detect when the corresponding freight vehicle made an abrupt speed or direction change, or when the freight vehicle made a left turn in a crowded region. As an addition or variation, the computer system 110 and/or trailer module 120 may use the sensors 134 to detect an abnormal shift in the cargo of the trailer 122 during transport. In such an example, the computer system 110 and trailer module 120 may trigger a notification to be sent to the freight operator's device.

As an addition or variation, the trailer module 120 may detect indicators of when the freight vehicle is on time with respect to the destination of the freight request. In such cases, the trailer module 120 may power down or otherwise switch to a low power mode to conserve batteries, with check-ins of the trailer module 120 occurring a maximum time apart (e.g., several minutes). When the computer system 110 detects that the freight vehicle has fallen behind schedule, the trailer module 120 may be alerted, and more frequent check-in may occur to monitor whether the freight operator can catch up and be on time. Additionally, the trailer module 120, and/or computer system 110 may increase the frequency by which the trailer module 120 is used when, for example, the freight vehicle approaches the destination of the freight request. As a variation, the frequency by which the trailer module may be used may alternatively be made subject to an event or condition that justifies increase use of power to monitor the respective freight vehicle and trailer 122.

The computer system 110 can also maintain a roster of freight operators and/or carriers. Each freight operator may correspond to an individual that operates a freight vehicle independently, or alternatively, on behalf of another entity. A carrier may refer to an entity that is responsible for a freight vehicle. In some cases, a freight operator can also be a carrier, but examples also provide for freight operators who can work for multiple carriers. As such, the freight system 100 may provide for the freight operator to operate different vehicles which may be operated under different carriers. Alternatively, the computer system 110 can monitor the freight operator and vehicle separately. Each freight operator may also be provided an operator interface, corresponding to a service application 116 that executes on the operator's mobile device (e.g., personal cellular voice/messaging device) to communicate with the computer system 110. Likewise, shippers may be able to interface with the computer system 110 in a variety of ways, such as through use of a mobile device 102 and service application 106, or through a browser that accesses a web page of the freight system 100. The computer system 110 may also include, for example, a server, or a combination of servers that operate to communicate with the trailer modules 120 and the mobile devices of shippers and/or freight operators (e.g., via respective service applications 106, 116).

Individual trailers 122 which house trailer modules 120 can be packed by the shipper and associated with a freight service request that is received by the computer system 110. The computer system 110 may then implement a matching process to select a freight operator to haul the trailer to a designated destination as specified by the freight service request.

In more detail, each trailer module 120 may include hardware and logic to obtain location information for the module, and to communicate the location information to the computer system 110. Additionally, each trailer module 120 may include sensors and other logic to enable the trailer module 120 to transmit information about a physical state of the corresponding trailer 122. As described in greater detail, a shipper can communicate a freight request to the computer system 110 using, for example, a mobile device on which a shipper interface (e.g., shipper service application) is operated. In connection with making the freight request, the shipper packages a load into one of the respective trailers 122 of the freight system 100. In some examples, the shipper is provided a trailer 122 from a pool of available trailers which reside within a sub-region of the shipper. In variations, one or more available trailers 122 are situated on-site with the shipper in advance of the shipper making the freight request. Still further, the shipper may be provided a reservation for a trailer that is in use. For example, once the reservation is made, a freight operator can drive the empty trailer 122 to the shipper facility 22. Thus, in some examples, the shipper may utilize trailers 122 which are provided by a third-party, either for a specific use or for ongoing use.

In some examples, the trailer module 120 may distribute multiple types of sensors within the interior of the respective trailer 122, in order to facilitate the determination of load information with respect to the packed load. For example, the trailer module 120 may use sensors to determine information such as (i) whether the load is properly packed, (ii) whether there is empty space within the interior of the trailer 122, (iii) the weight of the load, and/or (iv) other information that may be pertinent for selecting a type of freight vehicle to haul the packed trailer.

In some examples, the trailer module 120 may also include one or more control mechanisms 135 for controlling features or aspects of the trailer. By way of example, the control mechanisms 135 may be used to control a digital lock, remotely or through automation, subject to parameters determined by the trailer module 120. In the latter case, the trailer module 120 may determine the current location of the trailer 122, and a digital lock for the trailer may prevent the trailer from being opened until the current location of the trailer 122 is reported by the trailer module to be within a predefined geofence (e.g., within a 100-meter diameter of the destination of a completed freight request).

Further, the trailer module 120 may include one or more local communication interfaces to read sensors distributed within the interior or exterior of the trailer 122, as well as with the freight vehicle. For example, the trailer 122 may be equipped with optical sensors that detect free space within the confines of the trailer. As an addition or variation, the trailer and/or freight vehicle may include tire sensors or break sensors which can detect the presence of a load, as well as whether the load is heavy or light. For example, the tire sensors may indicate presence of a load based on the amount of pressure that is placed on the tire. Likewise, brake sensors may detect presence of a load (or a load that is heavy) based on the amount of strain the sensors measure, with the assumption being that a loaded trailer will exert more strain on the brakes. In other variations, the freight vehicle may include sensors that track the temperature and humidity of the freight vehicle. In some examples, the trailer module 120 may interface with the local sensors of the trailer 122 and/or the corresponding freight vehicle in order to obtain sensor information, which the trailer module 120 can communicate to the computer system 110.

In some examples, the computer system 110 implements a selection process to match the packed trailer 122 with a suitable and available freight operator once the trailer 122 is packed. In some examples, the trailer module 120 communicates output from its sensors and devices to indicate, for example, when the trailer 122 is fully packed or nearly fully packed. In variations, the trailer module 120 can determine when the trailer 122 is packed from other signals, such as from input provided by the shipper via the shipper's mobile device. Still further, in other variations, the computer system 110 may implement the selection process in advance of the trailer 122 being packed by the shipper. For example, the computer system 110 may implement the selection process to select a suitable freight operator concurrently, while the shipper is packing the trailer 122, so as to remove some lead time from when the selected freight operator would otherwise arrive to take the packed trailer 122. Still further, the shipper may reserve a window of time during which a freight operator can arrive to haul the packed trailer. In such an example, the shipper can make plans to pack the available trailer 122 in anticipation of a pick up during the scheduled window of time. Numerous other variations may also be implemented with respect to the timing of when the computer system 110 implements a selection process to select a freight operator for a given freight request. For example, the computer system 110 may implement the selection process in connection with a monitoring process that monitors the arrival of an empty trailer having a corresponding trailer module 120, for use with the shipper's freight request.

As described with other examples, the computer system 110 may implement the selection process to match a packed trailer 122 with an available freight provider that satisfies a set of criteria of the shipper. The selection process can initially identify freight operators that satisfy a threshold criterion of proximity. For cases in which the freight request is made after the trailer is packed, the threshold criteria can be based on identifying freight operators that are located within the threshold proximity of the shipper site. In some variations, when the shipper has, for example, made a reservation to have the packed trailer picked up, the computer system 110 may make a determination as to which freight operators are available and sufficiently proximate to the site of the shipper to pick up the packaged trailer 122 within the requested time interval. As described with other examples, the selection process may identify a set of criteria from which candidate freight operators are selected, and/or a matched freight operator is identified. By way of example, the set of criteria may include (i) a projected arrival time of the freight operator (e.g., when the freight operator can arrive at the shipper site, irrespective of travel time), (ii) an estimated travel time for the freight operator to arrive at the site of the shipper, (iii) a trip distance for the freight operator to travel from a current location or route to the shipper site, (iv) a capability of the freight operator's vehicle to accommodate a characteristic of the load, (v) a type of vehicle the freight operator is using, and/or (vi) an available amount of service time remaining for the freight operator, where the available amount of service time is the number of continuous hours the freight operator can drive without being subjected to a predetermined rule (such as a regulation, law, policy, etc.) by which the freight operator is to take mandatory rest for a minimum duration of time. In the latter case, the available amount of service time remaining may be compared to, for example, the time needed for the freight operator to pick up the packed freight. The capability of the freight operator's vehicle may become a criterion if, for example, the freight request specifies the load has a particular characteristic, such as size, weight, or need for temperature control.

In some examples, the selection of the freight operator is based on an estimated deadhead cost for the freight operator. The deadhead cost may be based on the amount of time and/or distance that a freight operator would have to operate his or her vehicle, without carrying a load (e.g., without attached trailer, or with empty trailer), in order to arrive at the shipper site. Thus, the deadhead cost may be minimal if a freight operator is found carrying a load to the shipper site, even though the freight operator may arrive later than another freight operator who would have deadhead cost.

Once the freight operator is selected, the computer system 110 may send a confirmation communication to the freight operator, via the freight operator's mobile device. The communication may identify the parameters of the assigned freight request, specifically identifying the destination, as well as other information (e.g., type of load, amount given to carrier for completing request, etc.). If the freight operator accepts the invitation, the freight operator may be guided or otherwise instructed to the shipper site, and specifically to the bay or location of the packed trailer 122. The computer system 110 may identify the packed trailer to the freight operator, using, for example, a numeric identifier that is visible from the outside of the trailer 122.

The computer system 110 may monitor the freight operator to ensure timely arrival. If the computer system 110 determines timely arrival may not be possible, the computer system 110 may reassign the freight request to a different freight operator, depending on the restrictions of the freight request. In some variations, the computer system 110 may communicate with the freight operator (e.g., using the mobile device of the freight operator) to automatically detect when the freight operator is at the shipper site. Once the freight operator is at the shipper site, the computer system 110 can provide the freight operator with additional instructions on locating the packed trailer 122 (e.g., identifying a numerical marker on an exterior of the trailer 122). Still further, in some examples, the freight operator is provided a guide (through the display of various instructional interfaces and/or content, provided through the freight operator's service application) by which the freight operator can take pictures and record information about a physical state of the trailer 122 (e.g., trailer exterior appearance, presence of physical damage to exterior or interior of trailer, the condition of the packed load within the freight, etc.). The pictures or recorded information about the physical state of the trailer may be compared to a threshold quality level or pictures or recorded information taken by the freight operator at the initiation of the freight transport. If the threshold level is not met, the freight operator may be prompted by the computer system 110 to resubmit pictures or recorded information.

In some examples, the computer system 110 independently monitors the freight operator's location (as communicated by the mobile device of the freight operator) and the trailer's location (as determined by the satellite receiver 132 of the trailer module and communicated via its wireless transmitter 136). By monitoring their locations from two sources, the computer system 110 can detect when the freight operator begins hauling the packed trailer 122 out of the shipper's site. The computer system 110 may continue to independently monitor the packed trailer 122 to the destination. In variations, the computer system 110 controls the trailer module 120, or alternatively the trailer module 120 includes logic to self-control and optimize its use of power resources (e.g., battery). In such examples, the trailer module 120 may go to sleep once the determination is made that the selected freight operator is operating the freight vehicle that is carrying the packed trailer 122 of the matched freight service request. Alternatively, the trailer module 120 may operate to check in at a given frequency that can be modulated in response to events or milestones (e.g., passage of time, distance traveled).

The computer system 110 can also guide the freight operator in delivering the packed trailer 122 to the destination. Once delivered, some variations provide that the freight operator is given another guide (e.g., through use of freight operator's service application) to record the physical state of the trailer 122 at time of delivery. For example, the freight operator may be guided to take pictures, and record information about the state of the interior or exterior of the trailer 122. The recorded information may be received and processed by the computer system 110.

In some examples, the computer system 110 can monitor the positioning of a pool of trailers over time, and implement repositioning operations to reposition the individual trailers based on estimated supply and/or demand at various sites. The repositioning operations can include assigning freight operators to haul empty trailers 122 to select sites, or utilizing semi- or fully autonomous freight vehicles in order to haul empty trailers 122 to desired sites (e.g., return back to shipper facility 22).

Figure 2:
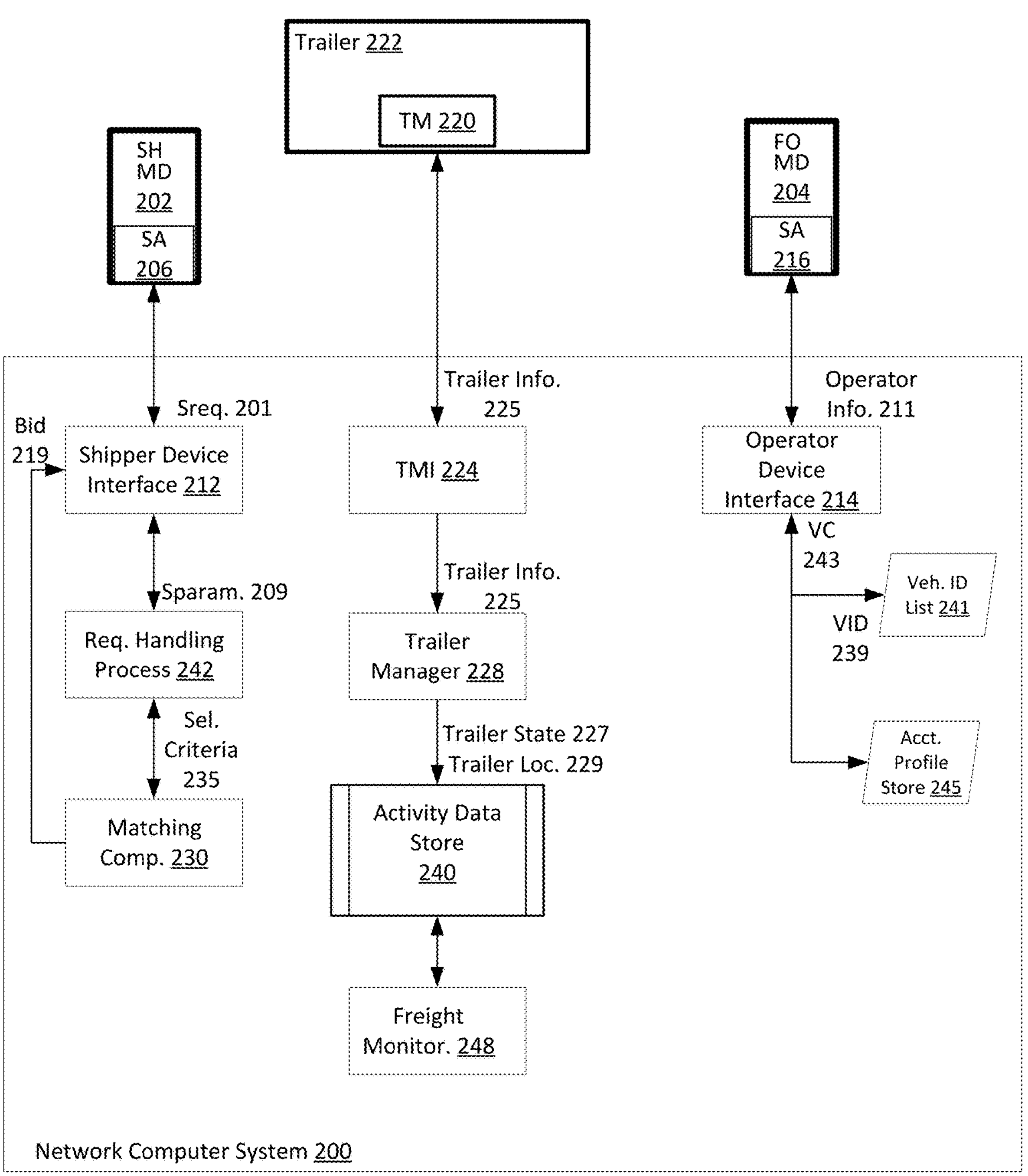
FIG. 2 illustrates an example network computer system to implement a freight system such as described with an example of FIG. 1.

FIG. 2 illustrates an example network computer system to implement a freight system such as described with an example of FIG. 1. A network computer system 200, as shown with an example of FIG. 2, may be implemented using, for example, a combination of servers (e.g., physical and/or virtual machines) operating on a network environment. In more detail, the computer system 200 may communicate over one or more networks with mobile devices 202 of shippers and/or freight operators (or carriers) in order to receive and exchange information to implement a freight shipping service.

According to some examples, the computer system 200 utilizes shipper device interfaces 212 to communicate with the mobile devices of shippers (as represented by shipper device 202). The computer system 200 also includes an operator device interface 214 to communicate with the mobile devices of freight operators (as represented by operator mobile device 204). Each of the shipper and operator device interfaces 212, 214 include logic and resources to enable a network link to be established between the respective mobile devices 202, 204 of the shipper and freight operator. Accordingly, the computer system 200 can receive freight requests 201 from the shipper mobile device 202 over one or more networks. In some examples, the shipper device 202 executes a service application 206 that enables the shipper to specify a freight request 201. The freight request 201 may include a set of service parameters 209, such as the destination for the freight, the origin or starting location (corresponding to the location of one of the trailers), as well as information about the load that the trailer 222 will be carrying.

The operator device interfaces 214 communicates with the operator mobile devices 204 to receive operator information 211. In particular, the operator information 211 may encompass multiple types of information, including an operator identifier, a current location of the freight operator, and movement sensor information acquired from the respective operator's mobile device. The operator mobile device 204 can execute a service application 216 that executes to obtain location information from a satellite receiver of that device. The service application 216 can be launched to continuously, or repeatedly communicate the operator information 211 to the computer system 200.

In some examples, the mobile device 204 of the freight operator uses a separate communication interface to communicate with an electronic logging device (ELD) of a corresponding freight vehicle. By way of example, the service application 216 may trigger the mobile device 204 to communicate with the ELD of an operated freight vehicle using a wireless, short range communication channel (e.g., Bluetooth). The ELD may provide the operator mobile device 204 with vehicle information, such as engine performance parameters (e.g., RPM of motor), and vehicle condition and environment parameters. The operator mobile device 204 may selectively relay the vehicle information to the computer system 200.

The operator device interface 214 receives the operator information 211, and associates the operator information 211 with an account/profile store 245. The account/profile store 245 may link the identifier of the freight operator to an account and/or profile. Among other information, the account profile store 245 may associate the freight operator with an account, and also with a log of service hours. The log of service hours tracks the number of hours in which the freight operator has operated a freight vehicle continuously, and/or the number of hours which the freight operator operated the freight vehicle over a recent time interval (e.g., number of hours in the past day).

The shipper device interface 212 may be used to communicate with the mobile devices of individual shippers. As represented by the shipper mobile device 202 of FIG. 2, the shipper mobile device 202 may operate a corresponding service application 206 to provide the shipper with an interface for creating and submitting freight requests 201 to the computer system 200. In some examples, the service application 206 of the shipper devices enables an interface where the shipper can specify service parameters 209 for the freight request 201. As an addition or variation, the shipper may also provide descriptive information about the load that is to be shipped. The service application 206 may also identify the shipper, and link the freight service request 201 to an account of the shipper.

According to some examples, the computer system 200 communicates with a collection of trailer modules 220, with each trailer module 220 being implemented within an interior of a respective trailer 222. The computer system 200 may communicate with the trailer modules 220, independent of shipper and/or freight operator mobile devices 202, 204. A trailer module interface ("TMI") 224 may trigger and/or control some of the operations of trailer module 220. The TMI 224 may establish a link with the trailer module 220 to receive periodic transmissions from within the trailer 222. As described with an example of FIG. 1, the trailer information 225 can include location information, as well as sensor information pertaining to a movement of the trailer.

Alternatively, the sensor information may correlate to or identify a physical state of the trailer 222. For example, the trailer information 225 may include sensor data that identifies the state of the trailer 222 as one of trailer being unpacked, partially packed, or fully packed. The sensor data, provided as part of the trailer information 225, can originate either from sensors that are integrated with the trailer module 220, or alternatively, with sensors that are integrated with or coupled to the structure of the trailer 222 and/or the vehicle. For example, the sensor data can include tire sensor data, read from tire sensors and/or brake sensors which are provided with the trailer 222 or freight vehicle. The tire and brake sensor data can be used to detect, for example, when a load is placed in the trailer 222.

According to some examples, the system 200 may include a trailer manager 228 that interprets the trailer information 225, as transmitted by the individual trailer modules 220, to independently determine the current location and state of each trailer 222. The trailer manager 228 may store trailer state information 227 and/or trailer location data 229 with the activity data store 240. The trailer state information 227 may reflect a load and/or use state of the trailer 222.

Over a given duration of time, the activity data store 240 may receive updates from the operator device interface 214 as to the current location of the freight operator, the vehicle the freight operator is operating, the service state of the freight operator and/or the load state of the freight vehicle. The freight operator's mobile device 204 may retrieve a vehicle identifier 239 from the ELD, or from another suitable mechanism. In an example of FIG. 2, the vehicle identifier 239 may be communicated as part of the operator information 211 to the system 200, via the operator device interface 214. The operator device interface 214 may reference the vehicle identifier to a vehicle library or list 241 to determine relevant information about the freight vehicle. In particular, the vehicle identifier 239 may be used to identify a size, capacity or other capability or characteristic 243 of the freight vehicle. The operator device interface 214 may update information about the freight operator with the activity data store 240. For example, the operator device interface 214 can generate an initial record when the freight operator starts a shift, by identifying the vehicle and one or more vehicle characteristics 243. As the vehicle is operated, the operator device interface 214 may update the record of the freight operator to reflect a current location of the freight operator. The duration of time in which the freight operator is operating the freight vehicle may also be recorded with the activity data store 240.

In some examples, the operator device interface 214 may also record the load state of the freight vehicle. The load state may correspond to one of (i) the freight vehicle being operated without trailer, (ii) the freight vehicle being operated with an empty trailer, (iii) the freight vehicle being operated with a partially full trailer, (iv) the freight vehicle having a fully packed trailer. In variations, more or fewer load states may be determined for the freight operator and/or the trailer 222. The load state may be determined from, for example, operator input (e.g., via the service application 216) or through operator activity (e.g., the operator accepting a freight request and arriving at a location of the freight request).

As an addition or variation, when the freight operator is assigned to a trailer 222, the trailer 222 may be associated with a use state. The user state may correspond to, for example, (i) a state of unused, or awaiting use, with the trailer 222 being stationary at the site of a shipper or other location, (ii) a state where use is initiated, such as when the trailer 222 is being packed, (iii) a state of use, when the trailer 222 is in active use (e.g., being used to haul a load to a destination), and/or (iv) a state of completed use (e.g., when the trailer 222 is delivered to a destination). In some variations, the state of use may be detected by sensor data provided by movements sensors of the trailer module 220, the trailer 222 and/or the freight vehicle. For example, as described with an example of FIG. 1, the trailer module 220 may be provided with one or more movement sensors, such as an accelerometer (or combination thereof) and/or gyroscope, which detect lateral and/or rotational acceleration and movement along an X, Y and Z access. By way of example, when the trailer is being packed, the trailer 222 may move vertically or rock to adjust for the weight of the load. This type of movement may indicate that the trailer 222 is in a state where use has been initiated through loading.

As described, the activity data store 240 records real-time (or near real-time) information about the trailer modules 220, freight operators and freight vehicles. With regard to trailer modules 220, the activity data store 240 may link a trailer's identifier (e.g., as provided with the trailer information 225) with its current location, as well as with a use state. The activity store may also link the freight operator with a freight vehicle, and the freight vehicle may be associated with a load state of the freight vehicle, as may be provided by, for example, the operator information 211.

The activity data store 240 may also be used to track individual freight operators based on the respective operator information 211. In an example, the activity data store 240 may maintain a record for the freight operator that identifies the most current location of the freight operator, as well as one or more types of service states of the freight operator (if known). In some examples, a type of state associated with the freight operator may be based on a whether a freight vehicle of the operator has an attached trailer. In this way, the freight operator may be associated with any one of multiple trailer states, such as respective states in which (i) a vehicle operated by the freight operator has no trailer attached ("without trailer state"), and (ii) a vehicle operated by the freight operator has a trailer attached ("with trailer state"). Additional states may also be implemented, such as (iii) a state in which the freight operator has an empty trailer ("empty trailer state"), and/or (iv) a state in which the freight operator has a packed trailer ("packed trailer state"). One or more states identified above may also be associated with a state that identifies whether an attached trailer includes a trailer module 220.

The activity data store 240 may also be used to track a service state of the freight operator. As examples, the service state can correspond to (i) deadhead, corresponding to when the freight operator is operating the freight vehicle with no trailer, or an empty trailer, (ii) on-route to pick up packed trailer, (iii) in trip to deliver packed trailer at destination, and/or (iv) at or nearing the destination of the freight request with the packed trailer. More or fewer states may also be defined, such as (v) idle, when the freight operator is not operating a freight vehicle, but is ready for assignment, (vi) loading, when the freight operator is at a site (e.g., shipping yard) to receive or load one of the trailers 222, and/or (vii) unloading, when the freight operator is unloading a packed trailer 222 at the destination.

According to some examples, a shipper may operate the mobile device 202 to generate a freight request 201 that is received by the shipper device interface 212. In some implementations, the shipper retains one or more trailers 222, each of which may be equipped with a respective trailer module 220. In such examples, the freight request 201 can specify the identifier of the trailer 222 (e.g., as by way of a numeric marker that is visible on the exterior of the trailer). Alternatively, the shipper can utilize the service application 206 to access a list of trailers 222 which the shipper has on-site, or otherwise available to the shipper based on the shipper's sub-region. In some variations, the system 200 selects a trailer 222 for the shipper's freight request 201, upon receiving the freight request 201. For example, the freight request 201 may specify an identifier of the trailer 222 that the shipper is using (or intends to use).

A request handling process 242 may process the request to identify the service parameters 209 of the service request 201, and to generate selection criteria 235, from which a matching component can implement a selection process to select a freight operator for the freight request 201. The service parameters 209 may identify, for example, the origin of the load (e.g., shipper's site), the destination for the load, and load parameters such as approximate weight, size, or type (e.g., flammable, etc.), as well as a need for a particular capability (e.g., size capacity, temperature control, etc.) of the freight vehicle or trailer. The service parameters 209 of the freight request 201 may also identify timing parameters which indicate an availability of the packed trailer 222 for pick up, either at the current moment, or at a time in the future (e.g., in four hours). In some variations, the set of timing parameters can also specify a time period by which the packed trailer 222 is to be picked up. Still further, the timing parameters can specify a time period in which the packed trailer 222 is to be delivered at the destination.

As an addition or variation, the request handling process 242 can calculate timing parameters that indicate a suitable pick up window of time for the packed trailer 222. The determination may be based at least in part on a status of the trailer 222 at the time when the shipper makes the freight request 201. For example, the request handling process 242 can monitor the trailer state 227 of the assigned trailer 222 for the freight request 201, as updated by the trailer manager 228. The trailer state 227 can identify changes in weight, free space or other sensor indicators which show the trailer is being or has been packed. Based on the state 227 of the trailer 222, the request handling process 242 determines an earliest time when the trailer 222 can be picked up.

The matching component 230 can select a freight operator for a freight request using selection criteria 235 that are based on the service parameters 209 of the service request 201. For example, based on the size and/or weight of the load, the matching component 230 can automatically identify a type of freight vehicle. In variations, the matching component 230 can anticipate a route of the freight operator and include selection criteria (e.g., vehicle suitable for operation in snow) to accommodate a condition (e.g., presence of snow or ice, temperature requirements for perishable freight, etc.). As an addition or variation, the selection criteria 235 can be based at least in part on a determination made from one or more service parameters 209. For example, the freight request 201 may specify a timing parameter for when the load is to be delivered at the destination. From the delivery time, the matching component 230 may determine the pick up window for the load. In some examples, the matching component 230 determines a maximum window for specifying pick up of the packed trailer 222 based on the timing parameters specified by the freight request 201 for arrival at the destination (e.g., delivery window).

Additionally, with respect to timing parameters, the matching component 230 can implement the selection process by filtering or weighting freight operators based on the amount of service time they have left before the freight operators are required to rest (e.g., by law, rule or policy). For example, the activity data store 240 may maintain a parametric value reflecting an interval of time that remains until a given freight operator is required (e.g., by regulation, law or policy) to stop operating the freight vehicle and rest. If, for example, a given freight operator has four hours of continuous operation time remaining before a mandatory break is required, but the freight operator needs five hours to pick up the packed trailer 222, the matching component 230 may filter out or deprioritize selection of that freight operator. As an addition or alternative, the matching component 230 can make a determination as to the number of rest intervals required by rule to occur for each freight operator of the candidate set, in order for that freight operator to pick up the packed trailer 222 and deliver the packed trailer 222 to the destination. For example, individual freight operators may operate under a set of rules that limit the continuous duration in which the freight operator can operate a freight vehicle (e.g., 14 continuous hours before mandatory rest). In such examples, the matching component 230 may recognize that a freight operator that is coming off a rest interval may be the more suitable for some longer freight assignments than an otherwise comparable freight operator who is nearing the limit of the continuous duration of vehicle operation by the freight operator.

The matching component 230 may also weight or prioritize one or more selection criterion over others, based on the service parameters 209 or other considerations. For example, by default, the matching component 230 may seek to minimize deadhead travel by a selected freight operator, as deadhead travel can represent a surcharge to the cost of the freight delivery. However, if the freight request 201 specifies a delivery window that is unusually narrow or close in time, the matching component 230 may prioritize or weight the criterion of identifying the freight operator that can deliver the packed load to the destination the soonest.

According to some examples, the matching component 230 implements a selection process that includes identifying a candidate set of freight operators, communicating an invitation to one or more of the freight operators of the candidate set, and then matching the freight request 201 to one of the freight operators of the candidate set. In some variations, the matching component 230 implements a progressive selection process that utilizes a set of selection criteria (e.g., distance, or calculated deadhead cost from a current location of the freight operator) to identify a first freight operator that satisfies the criteria. The freight operator may or may not accept the invitation for the freight request 201. If the invitation is not accepted, the matching component 230 then selects another freight operator to invite. Numerous other selection processes may alternatively be implemented. For example, the matching component 230 may broadcast the freight request 201 to a group of service providers who are deemed to satisfy one or more selection criteria (e.g., proximity threshold or deadhead cost). In some variations, a candidate freight operator, or a set of candidate freight operators is selected based on a determination that the freight operator is available. In such variations, the availability of the freight operators may be based on the service state of the freight operator and/or the load state of the freight vehicle which the freight operator is operating.

In determining the candidate set, some examples provide that the matching component 230 can also utilize additional criterion that can filter out freight operators who would otherwise satisfy the proximity criterion. For example, if the freight request 201 specifies a load that requires a particular type of freight vehicle (e.g., large freight vehicle for heavy load), the matching component 230 filters out those freight operators, from the pool of available freight operators, based on the type of freight vehicles the respective freight operators are operating.

In some examples, the matching component 230 may select a freight operator from the candidate set based on an optimization consideration. For example, the matching component 230 can select freight operators based on an optimization consideration of reducing deadhead cost. As part of the selection process, the matching component 230 calculates the distance the freight operator will have to drive without any load to arrive at the site of the packed trailer 222. In some examples, the matching component 230 implements a selection process, with the packed trailer 222 being immediately available. In such examples, the deadhead cost may be calculated from the current location of one or more freight operators. Depending on implementation, a separate determination may be made as to whether freight operators that are within the threshold proximity of the shipper are available to pick up the packed trailer 222.

In variations, the calculation of deadhead may include determining (i) all freight operators that are (or will be) in a threshold proximity to the packed trailer 222 at any time during a pick up window that is specified by the shipper, and (ii) a subset of the identified freight operators that will be available when located within the threshold proximity. The subset of the identified freight operators may thus include those freight operators that are completing a delivery to a destination that is within the threshold proximity. Accordingly, the matching component 230 may implement the selection process using information maintained in or with the activity data store regarding the freight operator or the freight vehicle.

As an addition or variation, the matching component 230 may implement a selection process of progressively identifying freight operators that satisfy selection criteria based on an optimization consideration. By way of example, the matching component 230 may identify a first freight operator (or set of freight operators), using a first set of criteria, which may include optimization considerations. If none of the identified freight operators are suitable (e.g., freight operator declines, or is not available), another determination may be made in which a constraint of the selection criteria or optimization consideration (e.g., increase radius of selection) is relaxed.

In some examples, the matching component 230 responds to the freight request 201 of the shipper with a freight bid 219. The freight bid 219 may be based on historical information, given, for example, an average shipping cost between the origin and destination, as well as an estimation of several available freight providers. In some variations, the matching component 130 may use the selection process to determine an approximate deadhead cost, or alternatively, a range of deadhead cost for the freight request 201. In such examples, the matching component 230 may determine the freight bid 219 based on the trip cost (e.g., duration, time) and the deadhead cost. The approximate or range of deadhead cost may be determined by the matching component 230 identifying a set of candidate freight operators from the active data store 240, given the window of time for the pick up (e.g., in the next 3 hours), and a proximity determination as between the packed trailer 222 and freight operators. The proximity determination can be based on, for example, a proximate (e.g., closest) freight operator to the packed trailer 222, a proximate and available freight operator, and/or an aggregate (e.g., average) proximity determination based on multiple nearby freight operators. Still further, the deadhead cost can be based in part on historical information, such as the average measured deadhead cost in a recent relevant period.

Once the freight request 201 is matched to the freight operator, some examples provide for system 200 to monitor the freight operator as the freight operator progresses towards the site of the trailer 222. The activity data store 240 may link a record for the freight operator, vehicle, trailer (or trailer module) and freight request 201. Additionally, mobile device 204 of the freight operator can continue to communicate location information as the freight operator drives towards the site of the shipper. According to examples, the freight monitoring component 248 can monitor the activity data store 240 to detect the progress of the freight operator in arriving at the site of the packed trailer 222. In some examples, the monitoring component 248 can estimate and repeatedly update the time of arrival for the freight operator. If the freight operator is determined to be late for pick up, or alternatively sufficiently late to jeopardize timely delivery arrival, the freight monitoring component 248 can trigger a remedial action. The remedial action may be determined by default. Alternatively, the remedial action may be based on parameters that are specific to the shipper or the freight request 201.

Additionally, the monitoring component 248 can monitor the trailer 222 as it is hauled by the selected freight operator to the destination. The monitoring may continue to detect timeliness of the delivery. If timeliness becomes uncertain, the monitoring component 248 may trigger one or more remedial actions, such as generating notifications to the shipper or other actions.

The monitoring component 248 can detect when the freight request 201 is complete. For example, the freight operator may communicate completion of the freight request 201 via the service application 216, and the monitoring component 248 can confirm the completion by detecting the location of the trailer 222. The trailer information 225 from the trailer module 220 can also be used to determine when, for example, the trailer is unloaded, or being unloaded. In some examples, the trailer manager 228 operates remotely to signal a locking mechanism of the trailer to lock.

In some examples, when the trailer 222 is delivered to the destination, the shipper or freight operator can be guided to perform a closeout process in which the physical state of the trailer 222 is recorded. The freight operator, for example, may be guided to use his or her mobile device 204 to take pictures and record information about the condition of the trailer 222 after it is unloaded. The trailer manager 228 may compare the pictures and recorded information to a threshold level for condition of the trailer 222. If the pictures or recorded information does not reach the threshold level, the trailer manager 228 may direct the freight operator to resubmit the photos or information, or complete an alternate closeout process.

The trailer manager 228 may also monitor trailer inventory at specific locations, such as at the specific locations of the shipper, or with sub-regions of the shipper. In some examples, the trailer manager 228 may estimate a minimum quantity of available (e.g., empty) trailers 222 for specific shippers, sites or sub-regions thereof. The estimate for the minimum quantity may be based on historical numbers, estimation of supply and demand and/or various other factors. If empty trailers 222 are to be repositioned, system 200 can generate separate freight requests 201 that can be assigned to freight operators by the matching component 230. The assigned freight operators may then fulfill the freight request 201 by hauling the empty trailers 222 to the site where the freight trailer is to maintain for a future use.

Still further, monitoring component 248 can monitor a performance of the freight operator when hauling the trailer module 220. For example, the trailer module 220 may record and transmit sensor data (e.g., accelerometer, gyroscope) which indicates sudden changes in direction or velocity. The monitoring component 248 may also detect instances when, for example, the freight operator makes a left turn. The performance of the freight operator may be used to rank the freight operator. In turn, the ranking of the freight operator may be used to weight (for or against) the selection of the freight operator for freight requests (e.g., freight operators that have better driving skills are matched more frequently to freight requests).

Figure 3:
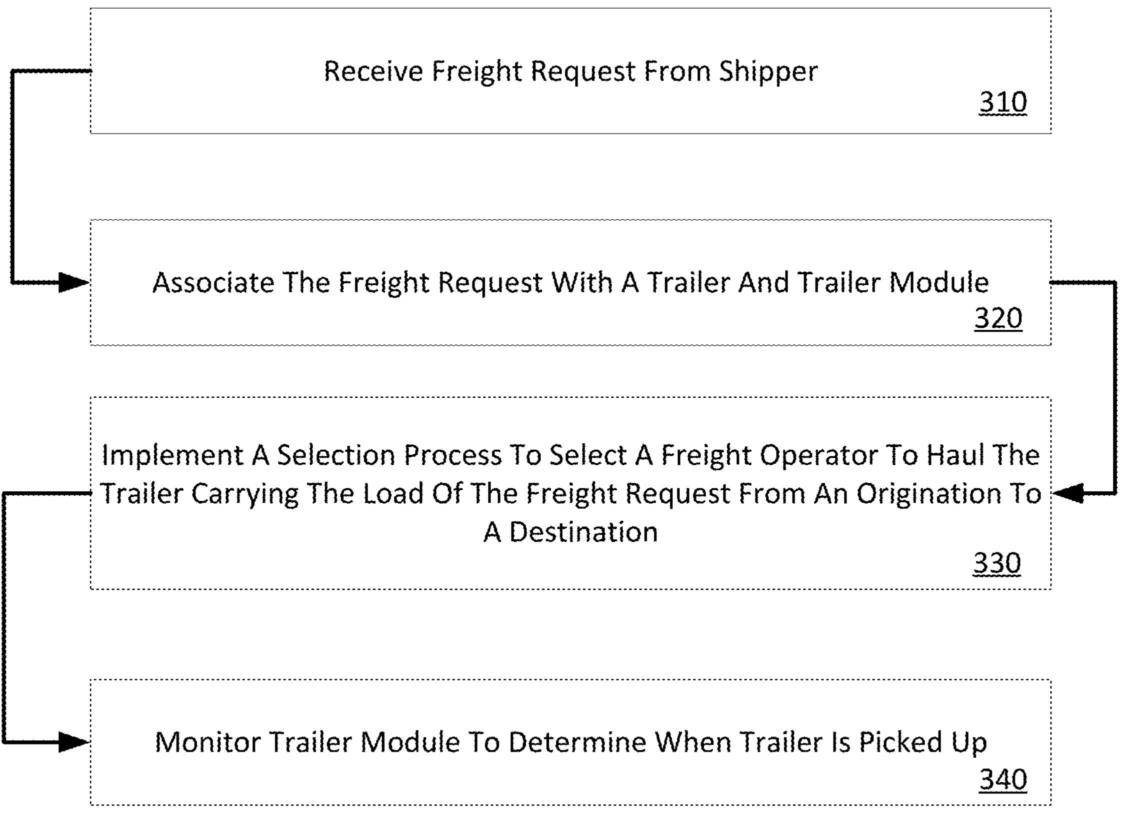
FIG. 3 illustrates a method for operating a network computer system to provide a freight service, according to one or more examples.

FIG. 3 illustrates a method for operating a network computer system to provide a freight service, according to one or more examples. A method such as described with an example of FIG. 3 may be implemented using components or elements as described with examples of FIG. 1 or FIG. 2. Accordingly, reference may be made to elements of FIG. 2 for purpose of illustrating a suitable component or element for performing a step or sub-step being described.

In an example of FIG. 3, the network computer system 200 may receive a freight request 201 from a shipper (310). The freight request 201 may specify a destination and a load for the shipper. In some examples, the load may be an unscheduled or unplanned for delivery. For example, the shipper may encounter an unplanned load that is subject to a timing constraint on delivery, as being part of a larger shipment that already has freight pick up.

The network computer system 200 associates the freight request 201 with a trailer 222 and/or a trailer module 220 (320). In some examples, the trailer 222 and/or trailer module 220 may be pre-located at the site of the shipper. In variations, the trailer 222 may be delivered to the shipper.

In response to receiving the freight request, the computer system implements a selection process to select a freight operator to haul the corresponding trailer of the trailer module (330) when the trailer is pre-loaded, or otherwise packed with the selected load of the shipper. In some examples, the computer system tracks freight operators to determine one or more types of state information. In some examples, the available freight operators may include those freight operators who have a service state that is available, meaning they are not operating a corresponding freight vehicle on behalf of another freight request. As an addition or alternative, the freight operator may be available based on a load state of considered vehicles. For a given vehicle, for example, the load state may correspond to one of (i) the freight vehicle being operated without trailer, (ii) the freight vehicle being operated with an empty trailer, (iii) the freight vehicle being operated with a partially full trailer, (iv) the freight vehicle having a fully packed trailer. In such context, an available freight operator may operate a freight vehicle that is without a trailer, or a freight vehicle that is operated with an empty trailer. Still further, in some examples, the computer system selects the set of freight operators (or the set thereof) based on an optimization consideration, such as to minimize deadhead fir the selected vehicle operator. To minimize deadhead, the computer system may, for example, make a preliminary determination to select the freight operator based on proximity conditions with respect to the site of the preloaded trailer.

According to some examples, the computer system may also monitor the trailer module using the trailer information, in order to determine when the trailer is picked up and delivered at the destination (340). Thus, for example, the computer system can determine when the corresponding trailer of the trailer module us picked up, independent of information provided by, for example, the freight operator or shipper. Likewise, the computer system may monitor the trailer module throughout the trip to the destination, and at the destination. The computer system may send notifications or updates to the shipper (e.g., if/when, for example, the freight operator is late).

Figure 4:
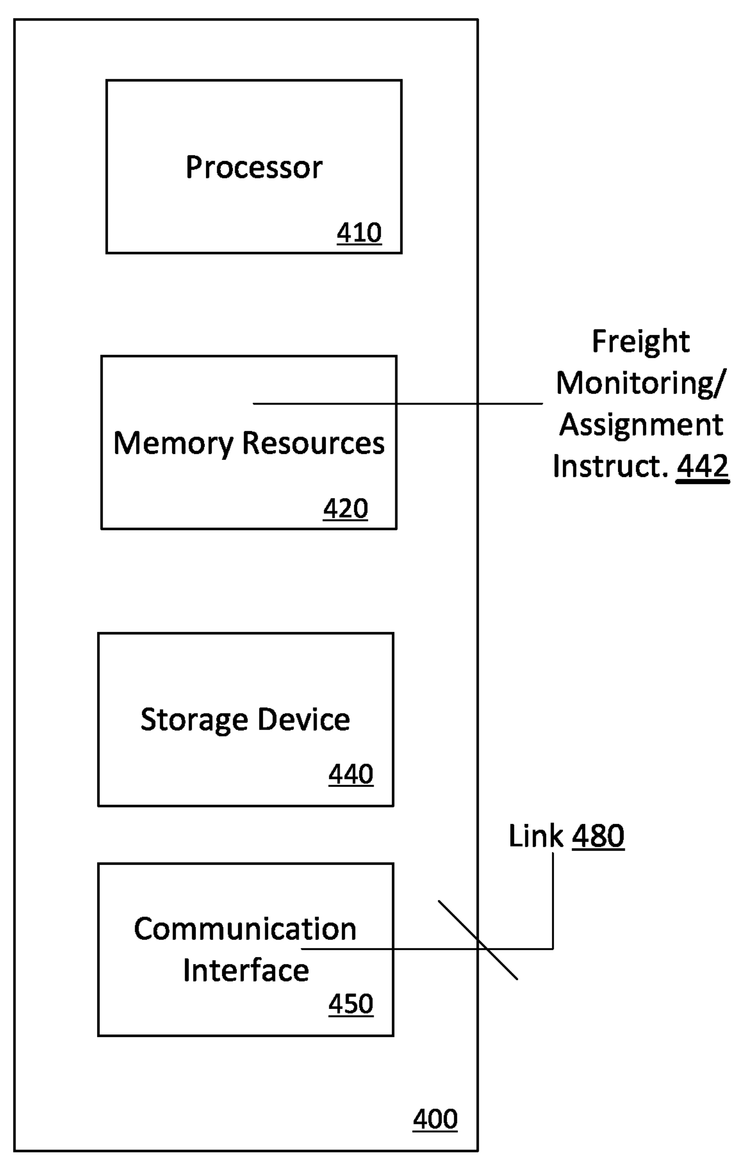
FIG. 4 illustrates a computer system upon which aspects described herein may be implemented.

FIG. 4 is a block diagram that illustrates a computer system upon which embodiments described herein may be implemented. A computer system 400 can be implemented on, for example, a server or combination of servers. For example, the computer system 400 may be implemented as part of the freight system 100 of an example of FIG. 1, or the network computer system 200 of an example of FIG. 2. Likewise, the computer system 400 may be used to implement a method such as described with an example of FIG. 3.

In one implementation, the computer system 400 includes processing resources 410, memory resources 420 (e.g., read-only memory (ROM) or random-access memory (RAM)), a storage device 440, and a communication interface 450. The computer system 400 includes at least one processor 410 for processing information stored in the main memory 420, such as provided by a random-access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the memory resources 420 or other static storage device for storing static information and instructions for the processor 410. A storage device 440, such as a magnetic disk or optical disk, is provided for storing information and instructions.

The communication interface 450 enables the computer system 400 to communicate with one or more networks (e.g., cellular network) through use of the network link 480 (wireless or a wire). Using the network link 480, the computer system 400 can communicate with one or more computing devices, specialized devices and modules, and one or more servers. The executable instructions stored in the memory 430 can include freight monitoring and assignment instructions 442, to implement a freight system such as described with an example of FIG. 1. The executable instructions stored in the memory 430 may implement a method such as described with an example of FIG. 3.

As such, examples described herein are related to the use of the computer system 400 for implementing the techniques described herein. According to an aspect, techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

Examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computing system comprising:

one or more processors;

one or more memory devices, the one or more memory devices storing instructions that are executable by the one or more processors to cause the computing system to perform operations, the operations comprising:

determining, based on data collected by one or more sensors of a trailer module, that a trailer module associated with a freight request is located at a first location;

receiving, over one or more networks from the trailer module communicatively coupled to the one or more sensors, a communication including a physical state of a trailer, the physical state of the trailer indicative of the trailer having been loaded, wherein the physical state of the trailer being determined based on the data collected by the one or more sensors, wherein the one or more sensors comprises a movement sensor;

determining, based on the physical state of the trailer indicative of the trailer having been loaded, an earliest time for pick up of the trailer;

determining a projected arrival time for a freight operator is after the earliest time for pick up of the trailer;

selecting, based on the physical state of the trailer and the projected arrival time of the freight operator being after the earliest time for the pick up of the trailer, the freight operator to perform the freight request;

automatically detecting, based on location determining hardware of a device associated with the freight operator, that the freight operator is at the first location; and based on automatically detecting that the freight operator is at the first location, transmitting a set of data that is executable by one or more processors of the device associated with the freight operator to cause an update to the device to provide instructions for locating the trailer via a display associated with the device, wherein the instructions comprise multiple interactive interfaces comprising input elements for taking pictures and recording information about the trailer.

2. The computing system of claim 1, wherein detecting that the trailer module associated with the freight request is located at the first location comprises determining that a current location associated with the trailer module is located within a predefined geofence.

3. The computing system of claim 1, wherein the operations further comprise:

determining, based on the data collected by the one or more sensors, a timeliness of the freight request; and based on the timeliness of the freight request, transmitting, over the one or more networks to a computing device, a notification indicative of the timeliness of the freight request;

obtaining completion data via a service application, the completion data indicative of a freight carrier completing a portion of the freight request associated with transportation of the trailer from a pick-up location to the first location; and based on obtaining the completion data, monitoring the data obtained from the one or more sensors to detect the timeliness of the freight request.

4. The computing system of claim 3, wherein the operations further comprise:

remotely operating to signal a locking mechanism of the trailer to lock based on the timeliness of the freight request.

5. The computing system of claim 1, wherein the operations further comprise:

determining, based on data from the one or more sensors, that the trailer is being unpacked.

6. The computing system of claim 5, wherein the one or more sensors comprises at least one of an accelerometer or gyroscope, the one or more sensors capable of detecting lateral or rotational acceleration.

7. The computing system of claim 1, wherein the operations further comprise guiding an operator to perform a closeout process.

8. The computing system of claim 7, wherein the closeout process comprises recording the physical state of the trailer.

9. The computing system of claim 8, wherein recording the physical state of the trailer comprising obtaining picture or text data indicative of a condition of the trailer after it is unloaded.

10. The computing system of claim 9, wherein the operations further comprise:

comparing the picture or text data to a threshold level condition for the trailer.

11. A computer-implemented method comprising:

determining, based on data obtained by one or more sensors of a trailer module, that a trailer module associated with a freight request is located at a first location;

receiving, over one or more networks from the trailer module communicatively coupled to the one or more sensors, a communication including a physical state of a trailer, wherein the physical state comprises the trailer having been loaded, wherein the physical state of the trailer being determined based on the data collected by the one or more sensors, wherein the one or more sensors comprises a movement sensor;

determining, based on the physical state of the trailer indicative of the trailer having been loaded, an earliest time for pick up of the trailer;

determining a projected arrival time for a freight operator is after the earliest time for pick up of the trailer;

selecting, based on the physical state of the trailer and the projected arrival time of the freight operator being after the earliest time for the pick up of the trailer, the freight operator to perform the freight request;

automatically detecting, based on location determining hardware of a device associated with the freight operator, that the freight operator is at the first location; and based on automatically detecting that the freight operator is at the first location, transmitting a set of data that is executable by one or more processors of the device associated with the freight operator to cause an update to the device to provide instructions for locating the trailer via a display associated with the device, wherein the instructions comprise multiple interactive interfaces comprising input elements for taking pictures and recording information about the trailer.

12. The computer-implemented method of claim 11, wherein the one or more sensors comprises an optical sensor, and wherein the optical sensor is configured to detect free space within the trailer.

13. The computer-implemented method of claim 11, further comprising:

determining that a load associated with the trailer is properly packed based on the data obtained by the one or more sensors.

14. The computer-implemented method of claim 11, wherein the data obtained by the one or more sensors is indicative of an amount of empty space within an interior of the trailer.

15. The computer-implemented method of claim 11, wherein the one or more sensors comprises at least one of tire sensors or brake sensors.

16. The computer-implemented method of claim 11, wherein the one or more sensors comprises a tire sensor, and wherein an amount of pressure that is detected by the tire sensor is indicative of a presence of a load.

17. The computer-implemented method of claim 11, wherein the one or more sensors comprises a brake sensor, and wherein an amount of strain measured by the brake sensor is indicative of a presence of a load.

18. The computer-implemented method of claim 11, further comprising:

determining a current location and a state based on the data obtained by the one or more sensors;

storing, by a trailer manager, information associated with the trailer state and the current location within an activity datastore; and periodically accessing data within the activity datastore to determine a current location and a current state of a freight request.

19. The computer-implemented method of claim 11, further comprising:

automatically detecting that a freight operator is at the first location based on location data associated with a freight operator device;

providing instructions via an interface of the freight operator device to locate the trailer within the first location; and providing a guide via the interface of the freight operator device, the guide comprising an instruction interface configured to record data associated with a current state of the trailer.

20. One or more non-transitory computer-readable media storing instructions that are executable by one or more processors to perform operations comprising:

determining, based on data collected by one or more sensors of a trailer, that a trailer module associated with a freight request is located at a first location;

receiving, over one or more networks from the trailer module communicatively coupled to the one or more sensors, a communication including a physical state of a trailer, the physical state of the trailer indicative of the trailer having been loaded, wherein the physical state of the trailer being determined based on the data collected by the one or more sensors, wherein the one or more sensors comprises a movement sensor;

determining, based on the physical state of the trailer indicative of the trailer having been loaded, an earliest time for pick up of the trailer;

determining a projected arrival time for a freight operator is after the earliest time for pick up of the trailer:

selecting, based on the physical state of the trailer and the projected arrival time of the freight operator being after the earliest time for the pick up of the trailer, the freight operator to perform the freight request;

automatically detecting, based on location determining hardware of a device associated with the freight operator, that the freight operator is at the first location; and based on automatically detecting that the freight operator is at the first location, transmitting a set of data that is executable by one or more processors of the device associated with the freight operator to cause an update to the device to provide instructions for locating the trailer via a display associated with the device, wherein the instructions comprise multiple interactive interfaces comprising input elements for taking pictures and recording information about the trailer.

* * * * *